(12) United States Patent
Fourie

(10) Patent No.: US 6,206,948 B1
(45) Date of Patent: Mar. 27, 2001

(54) METAL REDUCTION AND MELTING PROCESS AND APPARATUS

(75) Inventor: Louis J. Fourie, Pretoria West (ZA)

(73) Assignee: Ipcor NV, Curcao (AN)

( * ) Notice: Subject to any disclaimer, the term of this patent is extended or adjusted under 35 U.S.C. 154(b) by 0 days.

(21) Appl. No.: 09/230,409

(22) PCT Filed: Jul. 22, 1997

(86) PCT No.: PCT/NL97/00436

§ 371 Date: Jun. 28, 1999

§ 102(e) Date: Jun. 28, 1999

(87) PCT Pub. No.: WO98/04749

PCT Pub. Date: Feb. 5, 1998

(30) Foreign Application Priority Data

Jul. 25, 1996 (ZA) .................................................. 96/6312

(51) Int. Cl.$^7$ ............................. C21B 13/12; C21C 5/52; C22B 4/00; C22B 4/08
(52) U.S. Cl. ...................... 75/10.14; 75/10.15; 75/10.36; 75/10.38; 75/10.45
(58) Field of Search ............................... 75/10.14, 10.15, 75/10.36, 10.38, 10.45; 373/161

(56) References Cited

U.S. PATENT DOCUMENTS

| 1,411,157 | 3/1922 | Bradley | 266/173 |
|---|---|---|---|
| 1,819,238 | 8/1931 | Greene | 75/10.63 |
| 3,908,072 | 9/1975 | Collin | 75/10.15 |
| 5,411,570 | 5/1995 | Fourie | 75/10.15 |

FOREIGN PATENT DOCUMENTS

| 1758451 | 6/1968 | (DE) . |
|---|---|---|
| 2121564 | 5/1971 | (DE) . |
| 3420902 A 1 | 6/1984 | (DE) . |
| 0116405 | 1/1984 | (EP) . |
| 959.071 | 3/1950 | (FR) . |
| 1.205.446 | 2/1960 | (FR) . |
| 1087306 | 10/1967 | (GB) . |
| 1572248 | 6/1980 | (GB) . |

OTHER PUBLICATIONS

Alta Vista English Translations of DE 1,758,451 of pp. 15 and 16. 8 pages.*

* cited by examiner

*Primary Examiner*—Roy V. King
*Assistant Examiner*—Tima McGuthry-Banks
(74) *Attorney, Agent, or Firm*—Schwegman, Lundberg, Woessner & Kluth, P.A.

(57) ABSTRACT

A metal reduction and melting process which involves the heating of a burden comprising a metal containing component and a carbon containing component in a channel type induction furnace in order to reduce such metal containing component, in which at least part of the gaseous products of the process is utilized for preheating the burden; and apparatus for carrying out such preheating.

34 Claims, 2 Drawing Sheets

METAL REDUCTION AND MELTING PROCESS AND APPARATUS

This application is a national stage of PCT/NL97/00436, filed Jul. 22, 1997.

BACKGROUND TO INVENTION

This invention relates to a metal reduction and melting process, such as for example a steelmaking process, in which a metal and carbon containing burden is heated in a channel type induction furnace in order to cause the reduction and melting of the metal containing part of the burden, and apparatus for carrying out such preheating.

PRIOR ART

In a known process in this regard, i.e., that of U.S. Pat. No. 5,411,570, where the metal-containing component of the material being fed to the furnace comprises a metal ore, or a partially reduced metal ore (such as sponge iron in the case of an iron-containing burden), and the carbon-containing component coal; the material is fed substantially vertically into the furnace through one or more feed holes located along the side of the furnace in a manner so that the burden in the furnace forms a continuous longitudinally extending heap along each side of the furnace which floats on the bath of molten metal in the furnace.

In the said arrangement, the resulting gaseous products, mainly CO, and the volatile matter associated with the coal, are combusted in a cavity located in the furnace above the floating burden by burning them with oxygen, which is introduced into such area from outside the furnace.

It is also said that the gases resulting from such combustion, which are typically at a temperature in the order of 1600° C., can be utilized in the furnace for heating the burden or, where the material being fed to the furnace comprises steel scrap or cold iron, the spent carbon monoxide-related gas may be discharged through the same opening in the

OBJECT OF THE INVENTION

It is an object of the present invention to provide a metal reduction and melting process in which such combustion gases are better utilised.

SUMMARY OF THE INVENTION

According to the invention a metal reduction and melting process which involves the heating of a burden comprising a metal containing component and a carbon containing component in a channel type induction furnace in order to reduce such metal containing component, includes the step of utilising at least part of the gaseous products of such process for preheating the burden, i.e. prior to its introduction to the furnace.

It will be appreciated that if as a result of such preheating the temperature of the burden is increased beyond a predetermined value, the metal containing component in the burden will start to be reduced before the burden enters the furnace.

This will give rise to at least some gaseous reduction products being formed in the burden prior to its introduction to the furnace.

The particular temperature at which such reduction starts to take place in the burden before it enters the furnace, will of course be determined by the nature of the particular metal containing component in the burden.

Furthermore, as a result of such preheating of the burden at least some of the volatile matter associated with the carbon containing compound of the burden will also be released in the burden prior to it entering the furnace.

The aforesaid gaseous products which enter the furnace may accordingly comprise the aforesaid volatile matter together with the CO and $CO_2$ formed in the said reduction process.

It will be appreciated that such preheating of the burden not only gives rise to a reduced energy requirement in the overall process, but also to an increased throughput for the furnace.

Further according to the invention at least part of the aforesaid gaseous products are burnt with air and/or oxygen in the furnace and the combustion gases so produced utilised for said preheating of the burden.

Further according to the invention the burden is fed to the furnace in an elongated chamber which is provided with one or more passages extending around or through the chamber, through which passages the said combustion gases can pass in order to preheat the burden in the chamber.

Preferably the chamber and passage(s) are sealed off relative to one another so that no gaseous product can pass between them.

In a preferred form of the invention, such a passage may comprise an annular jacket which extends longitudinally around the chamber.

Further according to the invention the one or bottom end of said chamber may extend for such a distance into the furnace that it engages the heaps of burden floating on the bath of molten metal in the furnace.

In this manner the burden in the chamber is prevented from falling free Into the furnace through such end.

In one form of the invention a positive pressure may be maintained in said chamber in order to ensure that most of the gaseous products formed in the chamber will pass into the furnace.

Such a pressure may, for example, be brought about by introducing the burden to the chamber by means of a suitable lock system.

In addition, or alternatively, such positive pressure may be maintained by introducing a pressurised inert gas, such as nitrogen, to the burden prior to passing it into the chamber.

In one form of the invention at least some of the aforesaid gaseous products formed in the burden prior to its introduction to the furnace may be removed from the burden prior to the burden entering the furnace.

Thus, for example, at least some of the oxidising gases, such as $CO_2$ and $H_2O$-vapour, formed in the burden may so be removed from the burden.

The reason for removing such oxidising gases relates to the fact that if the temperature in the burden reaches a predetermined value, such oxidising gases may react with the metal and carbon containing components of the burden thus resulting in the consumption of the carbon containing compound.

Further according to the invention such oxidising gases may be removed from the burden by means of a elongated open ended conduit which extends longitudinally through said elongated chamber, so that its one or bottom end is located towards the bottom end of the chamber and its other or upper end communicates with a suitable gas withdrawal system, the conduit including over its length at least one gas outlet which is located at a predetermined level in the chamber.

In use, the conduit will accordingly be surrounded by the burden and its said gas outlet located at a predetermined level in the burden.

Further according to the invention said gas outlet of the conduit is located at a level in the chamber where the burden is at that temperature just before which said oxidising gases will start to react with the metal and carbon containing components of the burden.

Such preferred level may, for example, be determined experimentally by, for example, analysing the gas withdrawn from the conduit.

In addition, or alternatively, the temperature at the gas outlet of the conduit may be measured such as, for example, by means of a thermocouple or the like.

In practice, once the preferred level of said gas outlet of the conduit has been determined, its position will remain fixed and the temperature of the burden in said location controlled by, for example, controlling the rate at which the oxidising gases is removed from the conduit, and/or the rate of the preheating, and/or the rate at which the burden is fed through the chamber.

In the case where the metal containing compound comprises iron, and the carbon containing component coal, the aforesaid temperature will be in the order of 600° C.

The oxidising gases which are so removed may, for example, be utilised elsewhere or they may be passed to the said passage(s) utilised for preheating the burden.

Further according to the invention preheated oxygen and/or air are/is introduced to the conduit towards its said bottom end in order to combust any CO present in that part of the burden to $CO_2$, which is then also withdrawn through said gas outlet.

In order to ensure that substantially all the CO is converted to $CO_2$ before the gas reaches the said gas outlet, the wall of the chamber immediately below the gas outlet is maintained at a lower temperature relative to the rest of the chamber.

Such lower temperature may be obtained through suitable heat insulation, and/or by delaying the rate at which the burden in the chamber moves past such part of the conduit's wall. This latter operation could, for example, be effected by increasing the cross sectional width of the chamber in such areas.

Still further according to the invention at least some of the volatile matter associated with the carbon containing components of the burden is circulated from the said upper end of the conduit towards its said bottom end, where it can be combusted simultaneously with the CO by oxygen and/or preheated air.

As will be appreciated the heat supplied through such conversion and combustion will assist in the preheating of the burden.

Said circulation of the volatile matter may be brought about by means of an elongated open ended pipe of which the one end is located at a predetermined level towards said upper end of the conduit, and the other end towards said bottom end of the conduit.

Still further according to the invention, the carbon containing component of the burden may be charged to the chamber in such a manner that it is distributed towards the outer wall of the chamber, while the metal containing component of the burden is distributed towards the outer wall of said conduit.

In this way the carbon containing component (which provides the carbon which is required for the endothermic Boudouard reaction which in turn is required to convert carbon dioxide into carbon monoxide, which is ultimately required for reducing the metal in the metal containing component of the burden), is closer to the preheating source than the metal containing component, which in some cases reacts exothermically with carbon monoxide.

Further according to the invention the iron containing compound of the burden comprises an iron ore, and the carbon containing component, coal.

The invention will now be described further by way of example with reference to the enclosed drawings, in which:

DETAILED DESCRIPTION OF EMBODIMENTS OF THE INVENTION

Figure 1:
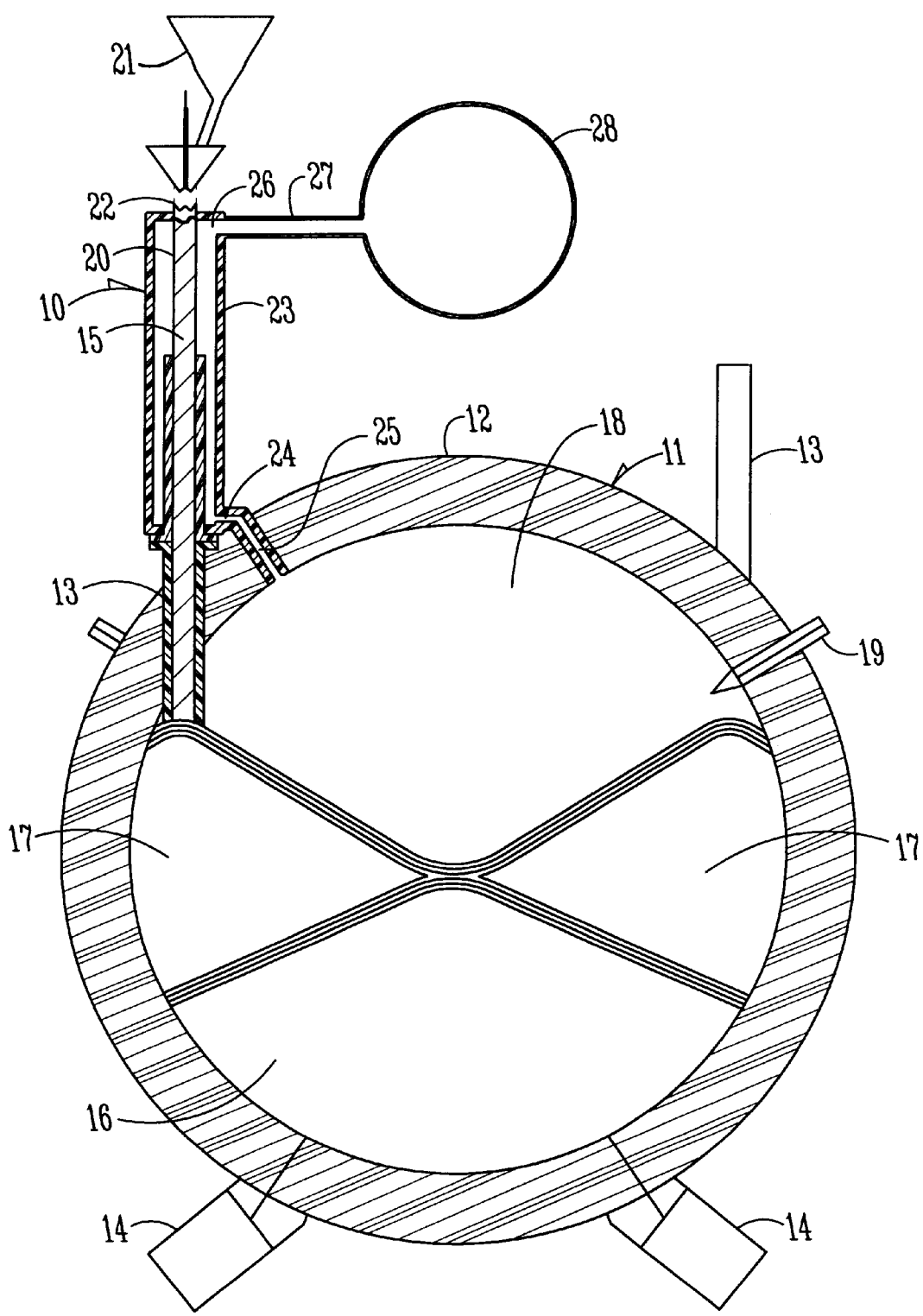
FIG. 1 is a diagrammatic cross sectional view of one embodiment of a furnace provided with preheating apparatus according to the invention.

In both embodiments of the invention a burden preheating arrangement 10 according to the invention is shown as being utilised with a channel type induction furnace 11.

Furnace 11 comprises an elongated tubular vessel 12 which is of circular configuration in cross section and which includes at least two parallel spaced rows of burden feed holes which each extends through the wall of vessel 12 along opposite sides thereof and of which only one, 13, is shown in detail in the drawings.

Vessel 12 is heated from below by means of two parallel spaced rows of electric induction heaters 14.

When used in a steelmaking process, vessel 12 is charged with a quantity of molten steel to form a bath 16, and a burden 15, comprising a mixture of coal and iron ore, is introduced to vessel 12 through feed holes 13 to float on the bath of molten steel 16 in the form of two spaced apart heaps 17 which each extends along a longitudinal side of vessel 12, and above which a cavity 18 is formed in vessel 12.

Vessel 12 is also provided with a plurality of oxygen burners 19, and at least one port (not shown) for removing the reduced and molten steel from vessel 12.

In the embodiment shown in FIG. 1, arrangement 10 includes an elongated chamber 20 of which the one end extends through feed hole 13 into the interior of furnace 11 to such a depth that it engages the upper end of heap 17.

Burden 15 is fed to chamber 20 via a burden feed bunker 21 and a series of lock systems 22.

Chamber 20 is surrounded by an elongated annular passage in the form of a jacket 23 which has a bottom inlet 24 provided with a nozzle 25 which passes through the wall of vessel 12 to communicate with area 18 of furnace 11.

Jacket 23 also includes a top outlet 26 which is connected via a pipe 27 to the duct 28 of a gas exhaust system (not shown).

Chamber 20 and jacket 23 are suitably sealed off with respect to each other to prevent any gas from passing from the one to the other.

In operation, vessel 12 is charged with a supply of molten steel 16, and induction heaters 14 switched on. A burden 15, comprising a mixture of coal and iron ore, is fed from bunker 21 via lock systems 22 and feed holes 13 into vessel 12, to form heaps 17 which float on top of liquid metal bath 16. The upper end of a heap 17 is engaged by the bottom end of chamber 20 so that the burden at the top of the heap blocks the open end of chamber 20, thus preventing burden 15 from falling freely from the open end of chamber 20.

Lock systems 22 ensure that a positive pressure is maintained in chamber 20 so that substantially no gas can escape from the cold upper surface of burden 15.

The gases, mainly CO, $CO_2$ and volatile matter resulting from the heating and consequential reduction of the iron containing component of burden 15 are burnt in cavity 18 by the oxygen supplied by burners 19.

The resulting combustion products are fed from area 18 via nozzle 25 and inlet 24 into jacket 23 where they serve to preheat the burden 15 located in the bore of chamber 20.

As a result of such preheating of burden 15, the throughput of furnace 11 is increased significantly.

The spent combustion gasses passing from jacket 23 via outlet 26 and pipe 27 to duct 28, can be used elsewhere in the process in order to utilise their chemical and/or thermal properties.

At the same time the coal associated volatile matter located in chamber 20 can as a result of such preheating of burden 14, be cracked to carbon, CO and $H_2$ which can then directly participate in the reduction of burden 15 in pipe 20. As a result of this, the coal and oxygen consumption per ton of product in the process can also be reduced significantly.

Figure 2:
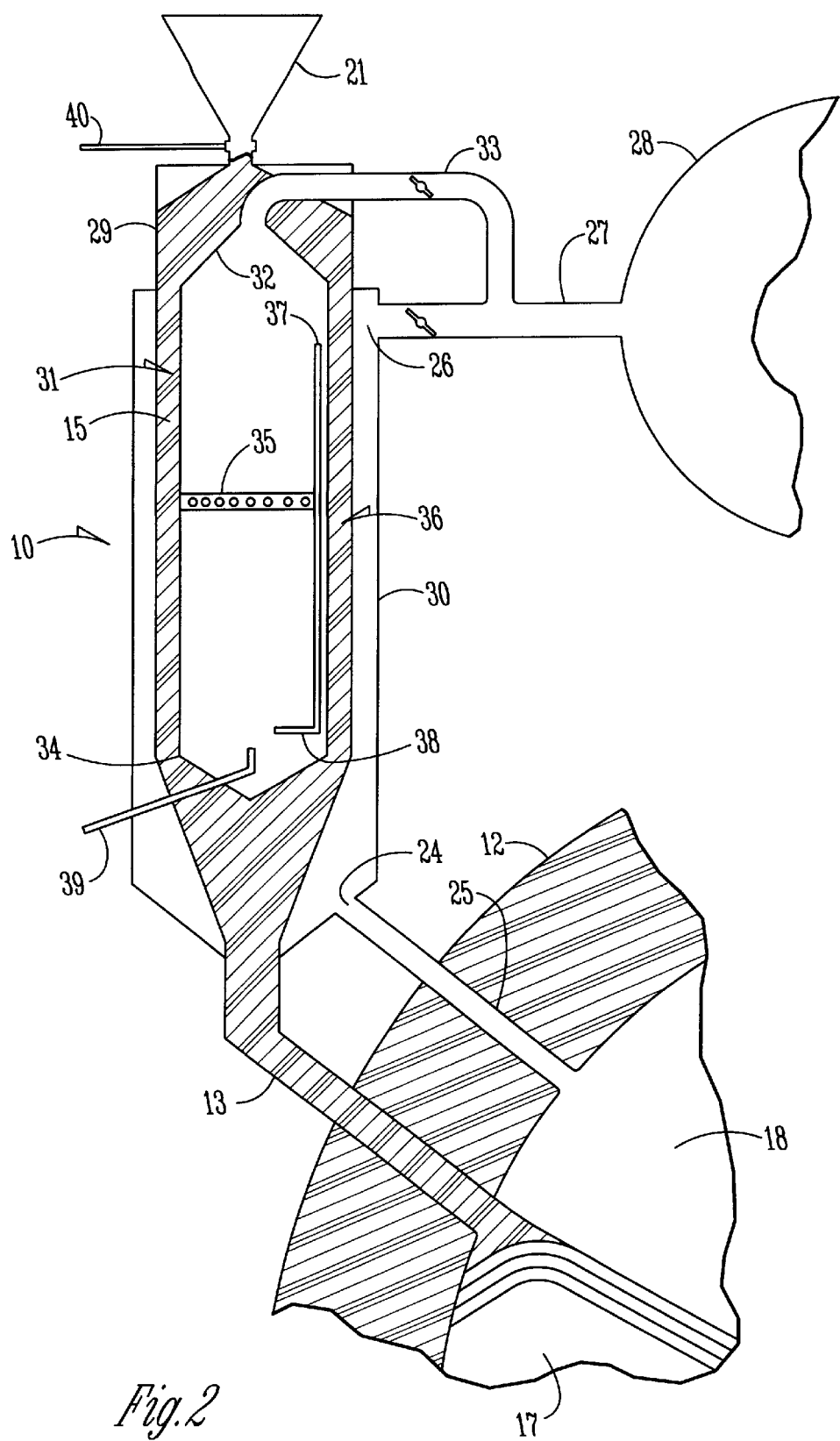
FIG. 2 is a similar view as that of FIG. 1 with parts shown broken away, of another embodiment of said apparatus.

In the embodiment shown in FIG. 2, wherein parts corresponding to those shown in FIG. 1 are indicated by the same number, a burden 15 is fed from feed bunker 21 to the upper end of an elongated chamber 29 of which the bottom end communicates with an inlet 13 in vessel 12 of furnace 11.

Chamber 29 is annularly surrounded by an elongated jacket 30 of which the bottom end has an outlet 24 which communicates via nozzle 25 with area 18 of vessel 12.

The upper end of jacket 30.1 has an outlet 26 which communicates via a pipe 40 with the duct 28 of a gas withdrawal system (not shown).

The outlet of feed bunker 21 is provided with a gas inlet pipe 30 by means of which an inert gas such as nitrogen can be passed into burden 15 and so into chamber 29 in order to put the latter under a positive pressure.

Chamber 29 is provided with an elongated open ended conduit 31 of which the upper end 32 communicates via a pipe 33 and pipe 27 with duct 28.

The lower end 34 of conduit 31 extends a predetermined depth into chamber 29. More details of this are given later.

When burden 15 is fed through chamber 29 into vessel 12, the burden in chamber 29 will annularly surround conduit 31 and engage its bottom open end 34.

Conduit 31 is provided towards the middle of its length with a series of apertures 35 which are of such size that gas, but not solid burden 15, can pass through them.

Conduit 31 is also provided with an elongated open ended pipe 36 of which the upper end 37 is located towards the upper end 32 of conduit 31 and its lower end 38 towards the lower end 34 of conduit 31.

Conduit 31 is also provided at its open end 34 with the inlet 39 of an oxygen preheated/air burner (not shown).

Conduit 31 is so positioned in chamber 29 that its apertures 35 are located in that part of burden 15 where its temperature is in the order of 600° C. Conduit 31 is furthermore of such a length that its upper end 32 is located in that part of burden 15 where its temperature is in the order of 200° C., and its lower end 34 in that part of burden 15 where its temperature is in excess of 800° C.

Furnace 12 is operated in the same manner as that described above in respect of the embodiment of FIG. 1.

During such operation, preheating of the lower end of chamber 29 by jacket 30 to a temperature in the order of 850° C. causes the Boudoard reaction to take place, In this part of burden 15, i.e. $C + CO_2 \rightarrow 2CO$.

Part of such CO will react with the iron component of burden 15 to form $CO_2$, thus causing the partial reduction of the iron component, i.e. $3Fe_2O_3 + CO \rightarrow 2Fe_3O_4 + CO_2$.

The formed $CO_2$ will flow upwardly in burden 15 until it reaches apertures 35 of conduit 31 through which it is then withdrawn via the bore of conduit 31 and pipes 33 and 27 to duct 28 of the gas exhaust system (not shown).

Another part of the CO will flow upwardly in the bore of conduit 31 where it will be burnt to $CO_2$ by oxygen/preheated air burner 39, i.e. $2CO + O_2 \rightarrow 2CO_2$, which $CO_2$ will then, with the $CO_2$ passing from apertures 35, pass via pipes 33 and 27 to duct 28.

At the same time any volatile matter and water vapour present in the upper parts of burden 15 in chamber 29 will pass from the upper end 37 of pipe 36 through its bottom end 38 into the bore of conduit 31 where the volatile matter will be combusted by oxygen/preheated air burner 39.

It will be appreciated that the heat developed in the conversion of the CO to $CO_2$, and the combustion of the volatile matter, will assist in heating up burden 15 in chamber 29.

It will be appreciated further that by locating conduit 31 in the said position in chamber 29 where its apertures 35 are located at that position where the temperature of the burden 15 is in the order of 600° C., the said $CO_2$ will be removed from burden 15 before it can react with the metal and/or carbon containing components of burden 15.

In order to further prevent such reaction from taking place, those parts of the wall of conduit 31 located immediately below apertures 35 may be maintained at a lower temperature relative to the rest of the wall. This, may, for example be effected through proper heat insulation of the wall and/or by reducing the flow rate of burden 15 through chamber 29 in such area. The latter operation may, for example, be effected by increasing the cross sectional width of chamber 29 in such area.

It will be appreciated further that the temperature of the burden at the lower end 34 of conduit 31 can be controlled by controlling any one or more of the following integers: (1) the rate at which burden 15 is fed through chamber 29; (2) the nature of the combustion in conduit 31, and (3) the rate at which the combustion gases are passed through jacket 30.

It will be appreciated still further that, if required, at least part of the gases formed in vessel 12 during the reduction of burden 15 can be sucked back via inlet 13 into chamber 29 in order for them to be utilised in the reduction and/or preheating of burden 15. The molten metal product of furnace 12 can further be treated and collected in the conventional manner.

It will be appreciated that the invention also includes within its scope apparatus for carrying out the process of the invention substantially as herein described. It will be appreciated further that there are no doubt many variations in detail possible with a process and apparatus according to the invention without departing from the spirit and/or scope of the claims.

Thus, for example, burden 15 may be charged to chamber 29 in such a manner that it is distributed towards the outer wall of the chamber for the reasons set out above.

What is claimed is:

1. A metal reduction and melting process which involves the heating of a burden comprising a metal containing compound and a carbon containing compound in a channel induction furnace in order to reduce such metal containing compound and to form gaseous products in the furnace, and to utilize at least part of such gaseous products for preheating the burden, which process includes the steps of feeding the burden to the furnace in at least one chamber which is provided with at least one passage extending around or through the at least one chamber, and passing at least some of said gaseous products through the at least one passage and wherein the at least one chamber and the at least one passage being sealed off relative to one another so that no gaseous product can pass between them.

2. The process of claim 1 wherein the at least one passage comprises an annular jacket which extends longitudinally around the at least one chamber.

3. The process of claim 1 which includes the step of maintaing a positive pressure in the at least one chamber so that most of the gaseous products formed in the at least one chamber as a result of the preheating of the burden in the at least one chamber pass into the furnace.

4. The process of claim 3 wherein the positive pressure is maintained by introducing the burden to the at least one chamber by means of a lock system.

5. The process of claim 3 wherein the positive pressure is maintained by introducing a pressurized inert gas, to the burden prior to passing it into the at least one chamber.

6. The process of claim 1 which includes the step of removing from the burden prior to the burden entering the furnace at least some of the gaseous products formed in the burden in the at least one chamber as a result of the preheating.

7. The process of claim 6 wherein the gaseous products comprise oxidizing gases.

8. The process of claim 7 further including the step of removing the gaseous products formed in the burden by means of an elongated open ended conduit which extends longitudinally through the chamber, so that a bottom end of the conduit is located towards the bottom end of the chamber and an upper end of the conduit communicates with a gas exhaust system, the conduit including over its length at least one gas aperture which is located at a level in the chamber where the burden is at a temperature just before which the oxidizing gases in the burden will start to react with the metal and carbon containing compounds of the burden to form products including at least $CO$, $CO_2$ and other volatile matter associated with the carbon containing component of the burden.

9. The process of claim 8 wherein the level of the gas aperture of the conduit is determined by analyzing the gas withdrawn from the conduit for its $CO$ and $CO_2$ content.

10. The process of claim 8 which includes the step of measuring the temperature at the gas aperture of the conduit by means of a heat measuring device.

11. The process of claim 10 wherein the heat measuring device is a thermocouple.

12. The process of claim 8 wherein once the level of the gas aperture of the conduit has been determined, its position remains fixed, and the temperature of the burden in said location is controlled by controlling at least one of the following: the rate at which the oxidizing gases is removed from the conduit; the rate of the preheating and; the rate at which the burden is fed through the chamber.

13. The process of claim 8, which further includes the step of circulating at least some of the volatile matter from the burden at the bottom end of the conduit towards the upper end of the conduit, and combusting it simultaneously with the $CO$ present, by means of oxygen and/or preheated air provided to that part of the chamber.

14. The process of claim 13 which includes the step of bringing about said circulation of the volatile matter by means of an elongated open ended pipe located inside the container, the one end of the pipe being located towards said upper end of the conduit in a manner so that it communicates with the burden, and the other end of the pipe being located towards said bottom end of the conduit.

15. The process of claim 7 wherein the oxidizing gases include $CO_2$ and $H_2O$ vapor.

16. The process of claim 6 which includes the step of utilizing the gaseous products so removed elsewhere in the process or passing them to the at least one passage utilized from preheating the burden.

17. The process of claim 6 wherein the gaseous products comprise $CO$, and further including the step of introducing preheated oxygen and/or air to the conduit towards its said bottom end in order to combust to $CO_2$ any $CO$ present in that part of the burden.

18. The process of claim 17 which includes the step of maintaining a part of the wall of the chamber immediately below the gas aperture at a lower temperature relative to the rest of the chamber so that substantially all the $CO$ is converted to $CO_2$ before the gas reaches said gas aperture.

19. The process of claim 18 wherein the lower temperature is effected by at least one of the following steps: (a) heat insulation of the said part of the wall of the chamber, and (b) delaying the rate at which the burden in the chamber moves past such part of the chamber's wall.

20. The process of claim 18 wherein the lower temperature is effected by employing a chamber of which the cross sectional width is larger in said part.

21. The process of claim 1 wherein the carbon containing component of the burden is charged to the at least one chamber in such a manner that it is distributed towards the outer wall of the at least one chamber.

22. The process of claim 1 wherein the iron containing compound of the burden comprises iron ore, and the carbon containing component, coal.

23. The process of claim 1, wherein air and/or oxygen is supplied to the furnace, and wherein at least part of the gaseous products comprises gases produced by burning in the furnace the gases resulting from the process with the air and/or oxygen supplied to the furnace.

24. The process of claim 1 which is carried out in such a manner that at least one heap of burden material is formed which floats on a bath of molten metal in the furnace, and wherein the one or bottom end of the at least one chamber extends for such a distance into the furnace that it engages the heap of burden in the furnace.

25. An apparatus for preheating the burden of a metal reduction and melting process which involves the heating of a burden comprising a metal containing component and a carbon containing component in a channel induction furnace in order to reduce such metal containing component and to form gaseous products in the furnace; and which involves utilizing at least part of the such gaseous products for preheating the burden, wherein the apparatus comprises at least one chamber through which the burden is fed to the furnace, and one or more passages extending around or through the at least one chamber, through which passages gaseous products formed in the process pass in order to preheat the burden in the at least one chamber; and the at least one chamber and the at least one passage being sealed off relative to one another so that no gaseous product can pass between them.

26. The apparatus of claim 25 wherein the at least one passage comprises an annular jacket which extends longitudinally around the chamber.

27. The apparatus of claim 25 wherein the one end of the at least one chamber extends for such a distance into the furnace engaging a heap of burden floating on a bath of molten metal in the furnace.

28. The apparatus of claim 25 wherein the at least one chamber includes a lock system for feeding the burden to the chamber so that a positive pressure is maintained in the chamber and so that most of the gaseous products formed in the chamber as a result of the preheating of the burden in the chamber pass into the furnace.

29. The apparatus of claim 25 wherein the at least one chamber includes means for introducing a pressurized gas to the burden prior to passing it into the at least one chamber in order to maintain a positive pressure in the at least one chamber.

30. The apparatus of claim 25, wherein the at least one chamber includes an elongated open ended conduit which extends longitudinally through the at least one chamber, so that a bottom end is located towards the bottom end of the chamber and an upper end communicates with a gas withdrawal system provided with the apparatus, the conduit including over its length at least one aperture which is located at a level in the chamber where the burden is at a temperature just before which oxidizing gases in the burden will start to react with the metal and carbon containing components of the burden to form products comprising at least one of CO, $CO_2$, and volatile matter associated with the carbon containing compound of the burden, through the at least one aperture at least some of the gaseous products formed in the burden prior to its introduction to the furnace is removed from the burden prior the burden entering the furnace.

31. The apparatus of claim 30, wherein the products formed in the burden comprise CO, and the at least one chamber includes means for introducing preheated oxygen and/or air to the conduit towards its said bottom end to combust to $CO_2$ any CO present in that part of the burden.

32. The apparatus of claim 31 wherein a part of the wall of the at least one chamber immediately below the gas aperture is maintained at a lower temperature relative to the rest of the chamber so that substantially all the CO is converted to $CO_2$ before the gas reaches the gas aperture.

33. The apparatus of claim 32 wherein the lower temperature is effected through at least one of the following manners: (a) heat insulation applied to the part of the chamber's wall, and (b) increasing the cross-sectional width of the chamber in the part of the wall.

34. The apparatus of claim 30 including an elongated open ended pipe located inside the conduit, one end of the pipe being located towards said upper end of the conduit, and its other end being located towards said bottom end of the conduit, the pipe being intended for circulating at least some of the volatile matter associated with the carbon containing component of the burden from said upper end of the conduit towards said bottom end of the conduit, where it can be combusted simultaneously with any CO present by means of preheated oxygen and/or air.

\* \* \* \* \*

UNITED STATES PATENT AND TRADEMARK OFFICE
CERTIFICATE OF CORRECTION

PATENT NO.     : 6,206,948 B1                                          Page 1 of 1
DATED          : March 27, 2001
INVENTOR(S)    : Fourie It is certified that error appears in the above-identified patent and that said Letters Patent is hereby corrected as shown below:

Column 1,
Line 39, after "the" insert -- furnace through which they were charged to the furnace, in order to preheat such steel scrap or cold iron by bringing such gases directly into contact with such material.
    In another process in this regard, i.e., that of USA Patent No. 1,819,238, the ore, carbonaceous material and fluxing materials charged to an induction-heated furnace through a charging port in one end of the furnace, forms a pile at that end and is gradually distributed and melted. The gasses that are formed are exhausted through the charging port, and combusted in such a manner that direct contact between the gasses and charge materials is ensured.
    In yet another known process, i.e., that of GB patent No. 1,572,248, where the melting unit can be a plasma or electric arc-type furnace, the gasses formed in the final reduction process are also passed through the material charging ports, allowing direct contact between the gas and charging materials.
    The same is true for the process disclosed in French Patent No. 1,205,446 where the melting unit can be channel-type furnace comprised of single or multiple vessels. The main reduction reaction according to this invention comprises that between the carbon dissolved in the metal and the iron oxide dissolved in the slag. The gas so formed is said to be passed countercurrently and in contact with the charge material to effect preheating and prereduction. --

Column 2,
Line 34, delete "Into" and insert -- into --, therefor.

Column 8,
Line 42, delete "component, coal" and insert -- component coal --, therefor.

Signed and Sealed this

Eighteenth Day of June, 2002

Attest:

Attesting Officer

JAMES E. ROGAN
Director of the United States Patent and Trademark Office